Nov. 18, 1952    R. BALL    2,618,214
ROW MARKER FOR TRACTOR IMPLEMENTS
Filed Jan. 2, 1947    2 SHEETS—SHEET 2
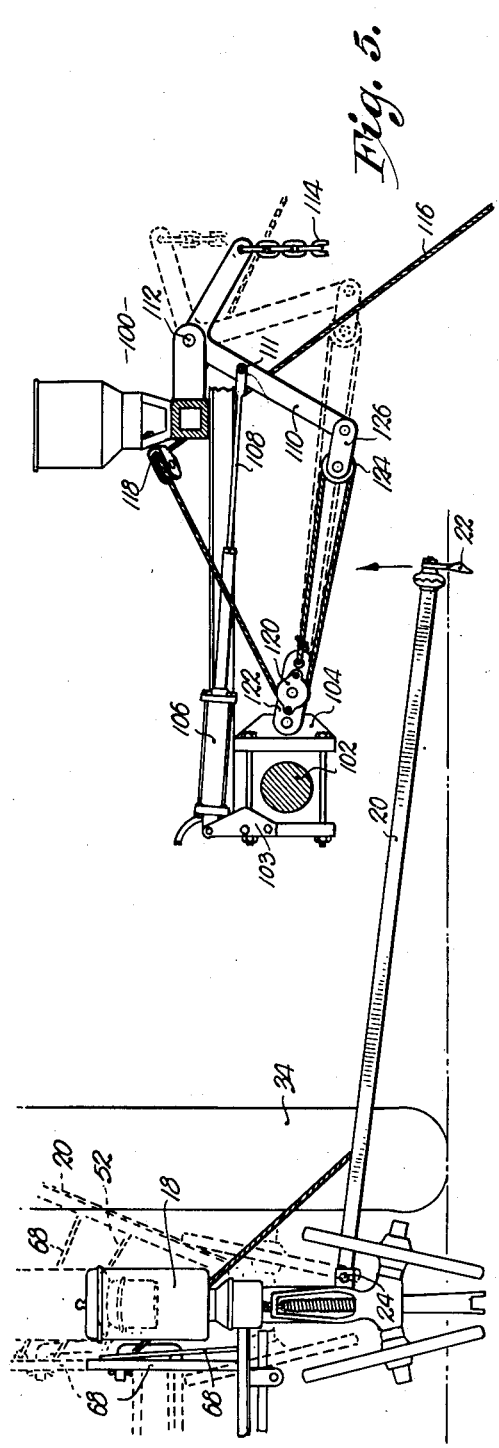
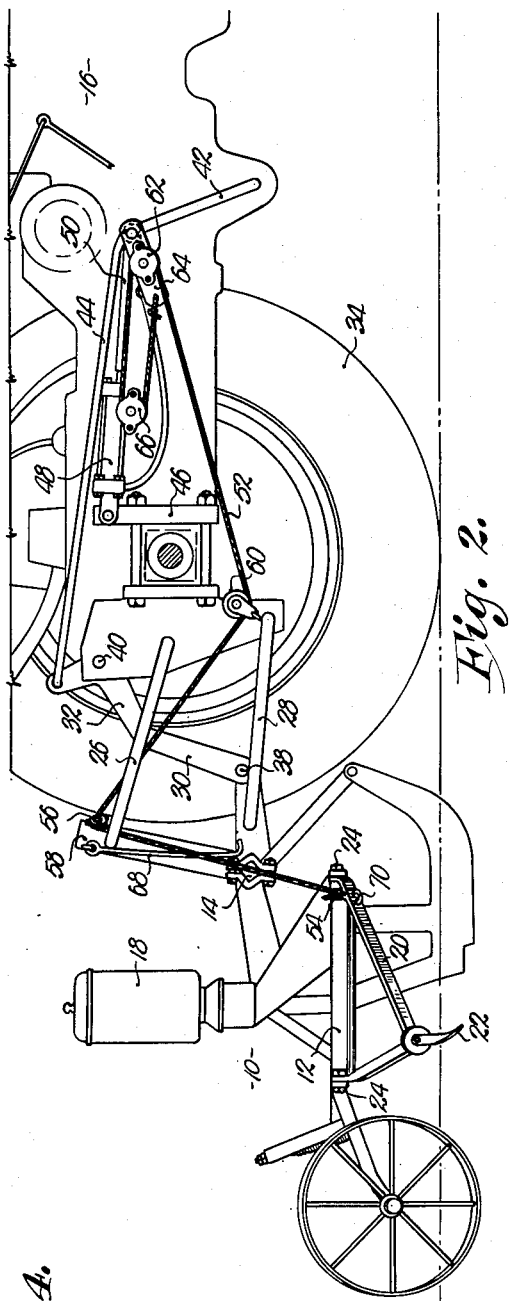
INVENTOR.
Roy Ball
BY
ATTORNEY.

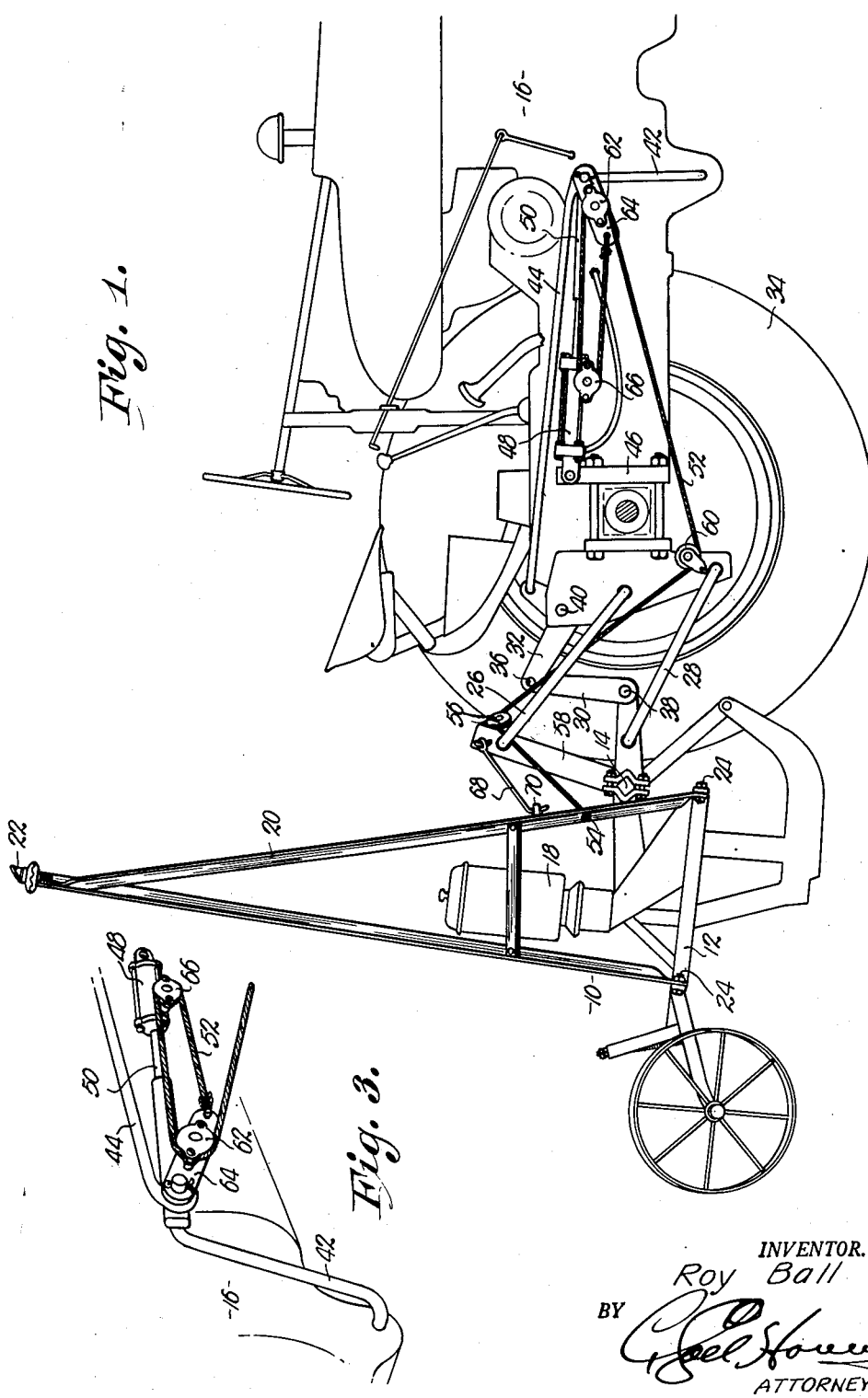

Patented Nov. 18, 1952

2,618,214

UNITED STATES PATENT OFFICE 2,618,214

ROW MARKER FOR TRACTOR IMPLEMENTS

Roy Ball, Mound City, Kans.

Application January 2, 1947, Serial No. 719,693

1 Claim. (Cl. 97—230)

This invention relates to farm implements, and particularly to corn planters or like tools that include as a part thereof, a device for marking the soil and thereby presenting a guide line, the primary object being to provide control means to raise and lower the marker automatically as the tool itself is shifted to and from an operative position engaging the ground traversed.

Corn planters are conventionally provided with a pair of row markers swingably secured to the planter itself for alternate use. Various means have heretofore been provided to elevate the markers and thereby hold the same in an inoperative position, but for the most part the mechanism for controlling the swinging movement of the markers requires separate and distinct manipulation having no connection with the raising and lowering means for the planter itself.

In the particular type of implement with which this invention is used, the corn planter is mounted on a tractor or other mobile support and there is provided an interconnection between the tractor and the planter for raising and lowering the planter. Such raising and lowering means includes a swingable arm or rock shaft carried by the tractor and actuated through the medium of a hydraulic system that includes a reciprocable plunger pivotally joined to the rock shaft.

It is the most important object of the present invention therefore, to include means in the nature of a flexible cable interconnecting the tractor and the row marker and including parts associated with the reciprocable piston of the hydraulic system and the swingable arm for raising and lowering the row marker as the planter itself is raised and lowered respectively.

Another object of this invention is to provide control mechanism for swinging the row marker that includes a pair of spaced-apart pulleys, one being fixed on the tractor or other supuport and the other pulley having connection with the rock shaft and accordingly with the reciprocable piston of the hydraulic actuator, there being a flexible cable joined at one end thereof to the row marker and trained over the two pulleys in such manner that the marker is raised as the pulleys move apart and lowered during movement of the pulleys toward each other in response to the operation of the hydraulic system.

A still further object of the present invention is to present a control system wherein the said flexible cable has a loop formed therein intermediate its end for receiving the two pulleys that move toward and away from each other whereby the length of the loop is varied and the row marker raised and lowered during reciprocation of the hydraulic piston or stem.

Other objects include important details of construction all of which will be made clear as the following specification progresses, reference being had to the accompanying drawings, wherein:

Figure 1 is a side elevational view of a tractor, a corn planter mounted on the tractor and a row marker attachment carried by the planter, together with the control mechanism forming the subject matter hereof for swinging the row marker.

Fig. 2 is a fragmentary, elevational view similar to Fig. 1 but showing the planter in a lowered operative position and one of the row markers at the lowermost end of its path of travel.

Fig. 3 is a fragmentary, perspective view showing the control mechanism hereof at that side of the tractor opposite to the side illustrated in Figs. 1 and 2 of the drawings.

Fig. 4 is a fragmentary, rear elevational view showing the planter and the marker arm in a lowered position; and Fig. 5 is a fragmentary, side elevational view of a modified form of control mechanism.

A corn planter of the two-row type is chosen for illustration of the control mechanism hereof and broadly designated by the numeral 10. Planter 10 includes a frame 12 mounted on a horizontal beam 14 that is in turn attached to a tractor 16 or other wheeled power vehicle.

Frame 12 also supports the conventional hoppers 18, one only of which is illustrated in the drawings, together with a pair of row markers, the right-hand marker being illustrated and including an elongated arm 20 having a hook-shaped marker 22 on the outermost free end thereof. The arm 20 is swingably secured to the frame 12 by means of aligned horizontal pivot pins 24 for movement of the arm 20 from the operative position shown in Figs. 2 and 4 to the inoperative position illustrated by Fig. 1 of the drawings. The entire planter 10, together with its two markers 20—22, is carried by the tractor 16 through the medium of pairs of bars 26 and 28, each of which is pivotally secured to the frame 12 of the tool 10 and to the tractor 16.

A link 30 and a bell crank 32 adjacent each wheel 34 respectively of tractor 16, are pivotally interconnected as at 36, link 30 being pivotally joined to the frame 12 as at 38 and bell crank 32 having pivotal connection with tractor 16 as at 40. Each bell crank 32 is joined with a swingable arm or rock shaft 42 mounted on the tractor 16 forwardly of the wheels 34 thereof, by means of an elongated rod 44 having pivotal connection both with bell crank 32 and the rock shaft 42.

The tractor 16 is provided with hydraulic mechanism for actuating the rock shafts 42 which includes a bracket 46 adjacent each wheel 34 thereof respectively, upon which is pivotally mounted an hydraulic cylinder 48 having a reciprocable piston therein of conventional character and in turn provided with an elongated stem 50 that is also pivotally joined with the arm or rock shaft 42 at its pivotal connection with rod 44.

It is now seen that when the stems 50 are extended from the position shown in Fig. 2 of the drawings, to the position shown in Fig. 1 of the drawings, the shafts 42 will be swung forwardly imparting a pull upon the rods 44, thereby swinging the corresponding bell cranks 32. Such action operating through the links 30, lowers the corn planter 10 to the normal operating position shown in Fig. 2 of the drawings.

In accordance with the present invention, such operation of the hydraulic mechanism effects a swinging movement of the two arms 20 to and from the normal marking position illustrated in Fig. 4 of the drawings. An elongated rope or other flexible cable 52, has one end thereof secured to arm 20 intermediate the ends of the latter as at 54.

Cable 52 extends from the arm 20 around an idler pulley 56 secured to an upright 58, forming a part of the frame 12 and to which the bars 26 are pivotally joined. From pulley 56, the cable 52 extends under and around a pulley 60 carried by the tractor 16 adjacent the bar 28, and around a pulley 62 joined to a link 64. The link 64 is in turn pivotally connected with the rock shaft 42. From the pulley 62, the cable 52 extends rearwardly and around a pulley 66 carried by the tractor 16 and particularly by the hydraulic cylinder 48. The other end of cable 52 is thereupon fastened in any suitable manner to the link 64. Identical mechanism is provided for each of the two marker arms 20 on each side of the tractor 16 as illustrated in Fig. 3 of the drawings.

In operation, when the hydraulic mechanism is operated to extend the stems 50, the corresponding pulley 62 will likewise swing toward the forwardmost end of the tractor 16. The distance between the pulleys 62 and 66 will thereby be increased, imparting a pull upon the cable 52 and automatically swinging the arms 20 to the upstanding position shown in Fig. 1 of the drawings as the planter 10 is shifted to its elevated position.

As the implement is transported to and from a place of use, the marker arms 20 are held in an elevated position by a hook-like element 68, swingably secured to upright 58 and cooperating with a loop 70 on the arm 20. Either of the two elements 68 may be used to hold one of the arms 20 in an elevated condition, while the other arm 20 is lowered and during marking by the hooklike shovel or marker 22.

A slightly modified form of the invention and embodying the same principles as above set forth, is illustrated in Fig. 5 of the drawings, wherein the planter is shown only fragmentarily and is designated by the numeral 100.

Axle 102 of the tractor is provided with a bracket 103 mounting a hydraulic cylinder 106 carrying a reciprocable stem 108. A crank 110 pivotally mounted as at 112, raises and lowers the furrow former, not shown, by means of a depending chain 114 as the crank 110 is swung in the manner indicated by full and dotted lines in Fig. 5. It is seen that the swinging movement of the crank 110 is caused by reciprocation of the stem 108 that is in turn pivotally joined with the crank 110 as at 111. Each of the row markers (not illustrated in Fig. 5) may be associated with corresponding planters as in Figs. 1 to 4 for raising and lowering simultaneously with the raising and lowering respectively of the chain 114 by means of a rope or the like 116 having one end thereof connected directly with the respective marker arm.

Cable 116 is trained over a stationary pulley 118, thence over a pulley 120, mounted on a link 122 pivotally carried by a bracket 104. From pulley 120, cable 116 is trained over another pulley 124 carried by a short link 126 that is in turn pivotally joined to the crank 110. From pulley 124, the cable extends rearwardly and is connected to the link 122. Swinging movement of the crank 110 as influenced by reciprocation of stem 108, varies the distance between the pulleys 120 and 124 as pulley 124 moves toward and away from the pulley 120. Such action operates to raise and lower the two row markers as the furrow openers (not shown) of the planter 100 are raised and lowered respectively.

It is appreciated that any number of hoppers may be provided, together with its associated structure in either of the tools 10 or 100 within the spirit and scope of this invention. In each of the two modifications, there is provided a loop in the flexible rope or cable 52, or 116 as the case may be, intermediate the ends thereof for receiving a pair of spaced-apart pulleys 62—66 and 124—120 that move relatively toward and away from each other, thereby varying the length of the elongated loop and consequently, raising and lowering the marker arms.

In the modification shown in Figs. 1 to 4 inclusive, a double action takes place in that the effective length of the cable 52 is decreased, not only by the pulley 62 moving away from the pulley 66, but by the fact that a pulling action is imparted to the cable 52 by the link 64 moving away from the pulley 66.

I claim:

In combination, a tractor having an implement pivotally connected thereto for vertical swinging movement, an arm mounted on said tractor in advance of said implement for swinging in a generally-vertical fore-and-aft plane, means on said tractor for swinging said arm, said arm being operatively connected with said implement for raising and lowering the same with swinging of said arm, a row marker pivotally connected to said implement for vertical swinging movement between a lowered laterally-extended operative position and a raised upstanding inoperative position, and structure for swinging said row marker to said raised position when said implement and row marker are raised as a unit with respect to said tractor, said structure comprising a first pulley connected to said arm for swinging therewith, a second pulley connected to said tractor at a point between said first pulley and said implement and row marker, cable guide means on said tractor and implement between said pulleys and said row marker, and a cable having one end connected to said arm and the other end connected to said row marker, said cable extending in one direction from said arm to said second pulley and therearound, thence in the opposite direction toward the first pulley and therearound, then generally in said one direction to and through said cable guide means, then generally laterally to said row marker; whereby swinging of said arm moves the first pulley toward and away from said second pulley and serves to change the length of the cable between the pulleys thereby swinging the row marker with raising and lowering of the implement frame.

ROY BALL.

REFERENCES CITED

The following references are of record in the file of this patent:

UNITED STATES PATENTS

| Number | Name | Date |
| --- | --- | --- |
| 763,342 | Doak | June 21, 1904 |
| 1,215,599 | White | Feb. 13, 1917 |
| 1,263,997 | Barry | Apr. 23, 1918 |
| 1,901,539 | Tapp | Mar. 14, 1933 |
| 1,917,733 | Psikal et al. | July 11, 1933 |
| 2,063,852 | Ray | Dec. 8, 1936 |
| 2,175,282 | Cormany | Oct. 10, 1939 |
| 2,176,363 | Silver | Oct. 17, 1939 |
| 2,178,124 | Robinson | Oct. 31, 1939 |
| 2,269,983 | Mott | Jan. 13, 1942 |
| 2,341,802 | Morkoski | Feb. 15, 1944 |
| 2,341,804 | Mott et al. | Feb. 15, 1944 |
| 2,371,037 | Englund | Mar. 6, 1945 |
| 2,502,067 | Weaks | Mar. 28, 1950 |
| 2,584,200 | Hand et al. | Feb. 5, 1952 |